Aug. 6, 1957 R. STUART-WILLIAMS 2,802,203

MAGNETIC MEMORY SYSTEM

Filed March 8, 1955 6 Sheets-Sheet 1

INVENTOR.
RAYMOND STUART-WILLIAMS
BY Lyon & Lyon
ATTORNEYS.

Aug. 6, 1957 R. STUART-WILLIAMS 2,802,203

MAGNETIC MEMORY SYSTEM

Filed March 8, 1955 6 Sheets-Sheet 2

INVENTOR.
RAYMOND STUART-WILLIAMS
BY Lyon & Lyon
ATTORNEYS.

Aug. 6, 1957 R. STUART-WILLIAMS 2,802,203

MAGNETIC MEMORY SYSTEM

Filed March 8, 1955 6 Sheets-Sheet 3

INVENTOR.
RAYMOND STUART-WILLIAMS
BY Lyon & Lyon
ATTORNEYS.

INVENTOR.
RAYMOND STUART-WILLIAMS
BY Lyon & Lyon
ATTORNEYS.

INVENTOR.
RAYMOND STUART-WILLIAMS
BY Lyon & Lyon
ATTORNEYS.

Aug. 6, 1957 R. STUART-WILLIAMS 2,802,203

MAGNETIC MEMORY SYSTEM

Filed March 8, 1955 6 Sheets-Sheet 6

INVENTOR.
RAYMOND STUART-WILLIAMS
BY Lyon & Lyon
ATTORNEYS.

2,802,203
Patented Aug. 6, 1957

2,802,203

MAGNETIC MEMORY SYSTEM

Raymond Stuart-Williams, Pacific Palisades, Calif., assignor, by mesne assignments, to Telemeter Magnetics and Electronics Corporation, Los Angeles, Calif., a corporation of New York Application March 8, 1955, Serial No. 492,844

13 Claims. (Cl. 340—174)

This invention relates to magnetic memory systems and, more particularly, is an improvement in magnetic core memories used for storing information.

The magnetic cores presently employed in magnetic core memories generally have a toroidal form and substantially rectangular hysteresis characteristics. A memory of this type is described, for example, in an article by Jay W. Forrester entitled, Digital Information Storage in Three Dimensions Using Magnetic Cores, Journal of Applied Physics, volume 22, page 44, January 1951. A more recent description is found in an article by Brown & Albers-Schoenberg entitled Ferrites Speed Digital Computers, which commences on page 146 in the April 1953 issue of Electronics, published by McGraw-Hill Publishing Company.

These articles show how the memory may be used in both the single-plane form as well as the three-dimensional form, wherein a word consisting of several binary digits may be stored in the memory or read therefrom.

In the actual operation of a magnetic memory, information is stored in the binary system using saturation at one polarity as indicative of, for example, the 0 and saturation in the opposite polarity as indicative of the 1. To facilitate the description herein, the P-state of magnetization will represent 0 and the N-state of magnetization will represent 1. In order to read information from the memory, the customary method is to drive the cores containing the desired information to saturation at one polarity only, for example, the P-state. If the core is already in the P-state at the time of such drive, it remains there, but if it was in the N-state, it is driven to P. A reading coil is coupled to the cores being driven, and if a voltage is induced therein the information conveyed is that the core was in N. If no voltage is induced in the reading coil, then the information conveyed is that the core was in P.

It will be readily appreciated that reading from a memory of this type in this fashion oftentimes destroys the information stored and, as a portion of the reading cycle, it is necessary to restore the information read back into the memory. This type of reading operation is known as a destructive readout. It will thus be appreciated that additional time is required, whenever a reading operation is performed, to write back the information which has been read.

An object of the present invention is to eliminate extra time to restore information which has been read out of a memory.

Another object of the present invention is to permit the operation of a magnetic memory within shorter operating intervals than were required heretofore.

The types of memory systems previously known permit at one time either a reading operation or a writing operation, but not both together. A feature of the present invention is the ability to simultaneously read and write into the system.

Still a further object of the present invention is the provision of a novel, useful, and simple magnetic memory system.

These and other features and objects of the invention are achieved by dividing the cores in a magnetic memory into groups. A desired core in one group receives a drive to saturation at P, while simultaneously a core in the other group receives a drive to saturation at N. Means are provided to detect any output from the core in the one group as a result of its drive whereby the data stored therein may be identified. Means are provided to inhibit or not the drive on the core in the other group in accordance with the data desired to be stored in such core. These operations are achieved by providing, for example, in a core plane array consisting of a plurality of toroidal cores arrayed in columns and rows a plurality of row coils, each of which is coupled to two rows of cores. The coupling to one row is with a sense which is different than the coupling to the other row. A plurality of column coils are provided which are connected to the cores to enable substantially the same effect. Thereby, application of the half-drives to a respective row and column coil result in two cores being driven, one toward P and one toward N. Two digit-plane coils are provided, each of which is respectively coupled to the cores of one group. Two reading coils are provided each of which is respectively coupled to all the cores of one group. In this fashion, one reading coil is used for reading in one group of cores while the digit plane core for the other group can serve for the purpose of applying an inhibit drive or not, as desired, into the system, to either write new information or restore that previously read. Then, on the next cycle of operation, the other reading coil reads while the digit-plane coil for the one group is used for inhibiting or not as required.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1 is shown in order to simplify and render more intelligible the figures of the drawings shown hereinafter;

In computer systems, wherein buffer stores are employed, it is often desirable to perform both a reading and writing operation simultaneously, using the buffer store. The magnetic-core memory is admirably suited for this type of operation. However, heretofore, the ability to both read and write simultaneously has not been shown. If, as is customary, a small matrix is employed for buffer storage, delta and other effects are not too important. In such storage devices, a coincident type of drive may be employed. This type of drive requires the simultaneous excitation of the row and column coils which are coupled to a core (or plurality of cores, where a three-dimensional memory is employed). With larger core arrays, the type of drive employed can be the staggered type; that is, the excitation is applied to one coil at a sufficient time in advance of the application of excitation to the other coil to permit adverse effects to subside. Either type of excitation may be employed with the present embodiment of the invention. It is to be understood, however, that this is not to be construed as a limitation upon the invention.

In accordance with this invention, a memory plane may consist of an array of magnetic cores having row coils designated as X-coils and column coils designated as Y-coils. It also has four additional coils consisting of two reading coils and two digit-plane coils. The cores of the memory are divided into two groups, with one digit-plane coil and one reading coil being coupled to all the cores in one group and the second digit-plane coil and the second reading coil being coupled to all the cores in the second group. The row and column coils are coupled to the cores in a manner so that when an excitation of one polarity is applied consisting of half-drives to an X- and Y-coil, one core in one group receives a drive to saturation in one polarity and one core in the second group receives a drive to saturation in the opposite polarity. The one of the reading coils which is coupled to all the cores in one group can be employed to read the condition of the core being driven to saturation in the one polarity while the digit-plane coil coupled to all the cores in the other group can be employed to inhibit or not the drive to the core in the second group, as determined by the information desired to be stored therein.

Figures 1, 2:
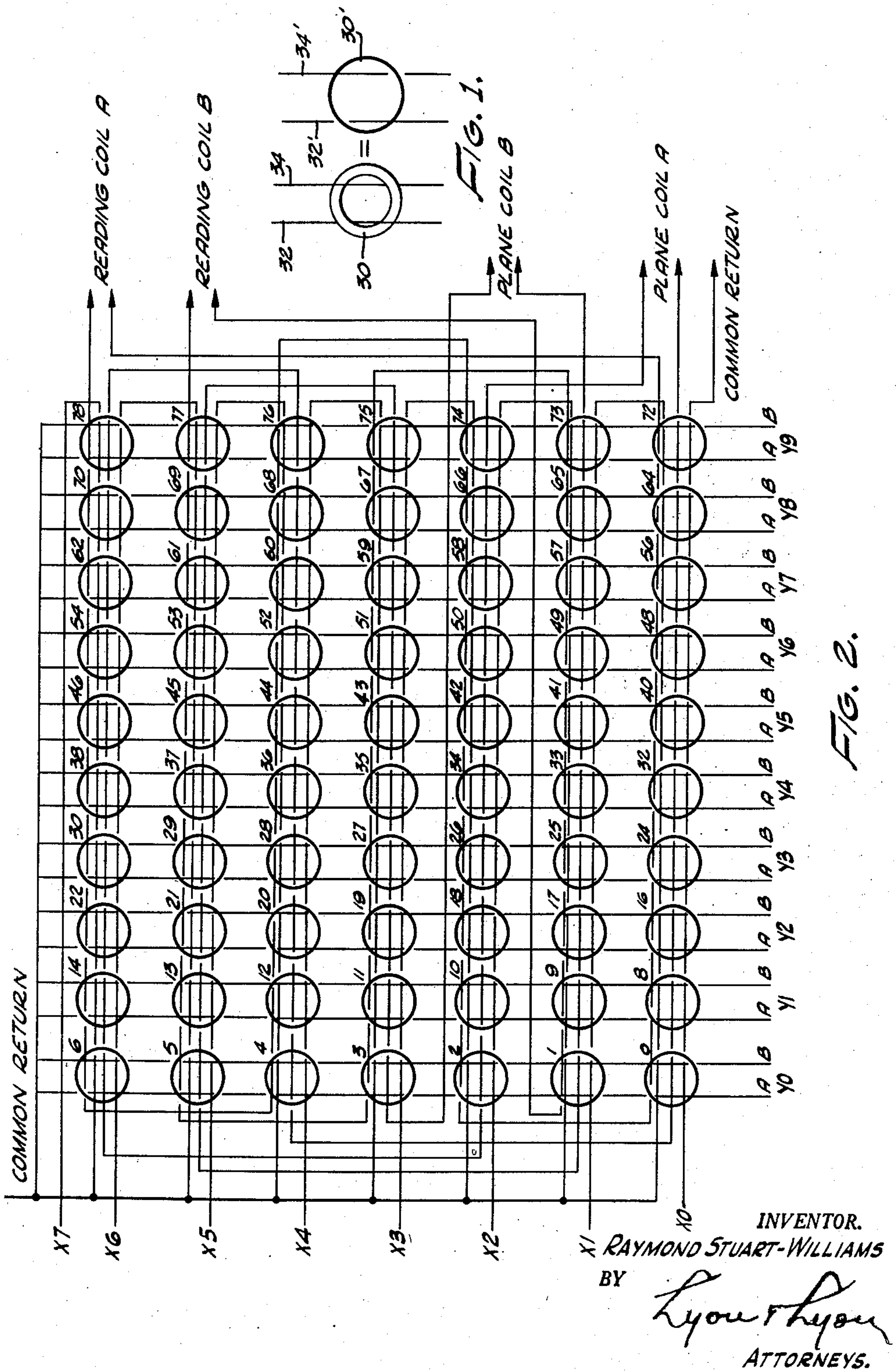
Figure 1 is a drawing of cores and coils and the symbols subsequently used in the drawings to represent them.
Figure 2 is a schematic drawing of an embodiment of this invention.

Referring now to Figure 1, a core 30 used in a magnetic memory may have the well-known form represented by the toroid. The windings of coils which are used to either drive a core or detect voltages when it is driven are coupled to the core by one or more turns which pass through the hole in the center of the core. Such windings are designated by 32 and 34. One (32) is coupled to the core in one sense and the other (34) is coupled to the core in the opposite sense. As shown in the drawing, core 30 is represented by the circle 30'; the winding 32 is represented by the line 32', which is interrupted as it passes through the top of the circle corresponding to the winding passing down through the toroid. Similarly, 34' is interrupted in passing through the circle at the bottom, corresponding to the winding passing up through the core. A single-turn coupling is shown. It will be understood that a multi-turn coupling may be employed without changing the significance of the representation shown herein.

Figure 2 is a schematic of one embodiment of the invention. A 7 x 10 array of cores arranged in columns and rows is shown by way of example. The principles described, however, are readily applicable to larger or smaller matrices. Each row or X-coil consists of two parts; for example, if the X2-coil is followed, it is coupled to the row of cores numbered 2, 10, 18 . . . 66, 74, which comprises one part, and then it is coupled to cores 73, 65, 57 . . . 9, 1, which comprises the second part. The coupling of the first part to the cores in the row is of an opposite sense to the coupling of the second part of the coil to the second row. The other row coils are identical; namely, they are coupled to one row of cores with a sense which is opposite to their coupling to the other row of cores. In view of this fact, when a current is applied to the row coil, the magneto-motive force resulting therefrom will tend to drive the cores coupled to the first part of the coil toward saturation at one polarity and the cores coupled to the other part of the coil toward saturation at the opposite polarity.

Two column coils are provided for each column of cores. The column coils are respectively designated as Y0 to Y9, and the two coils in each column are respectively labeled A and B. It should be noted that the sense of the coupling of the column coils to any given core is opposite, and the senses of these couplings are reversed for each succeeding core. For example, the core designated by 0 has the A- and B-coils coupled thereto with an opposite sense; the coil designated by 1 has the A- and B-coils coupled thereto in an opposite sense, but these are reversed from what they were on the 0-core.

Two digit-plane coils, respectively designated digit-plane coil A and digit-plane coil B, are provided. Digit-plane coil A is coupled to all the cores bearing even numbers in the memory; digit-plane coil B is coupled to all the cores bearing odd numbers in the memory. Two reading coils, respectively designated as reading coil A and reading coil B, are likewise respectively coupled to all the even numbered cores and all the odd numbered cores. Essentially, therefore, the cores in a memory in accordance with this invention may be considered as divided into two groups; the odd-numbered cores being in one group and the even-numbered cores being in another group. The sequence and sense of coupling of the reading coils and the digit-plane coils to the memory rows and columns should be made in accordance with the best core memory practice and to minimize unwanted signal voltages.

Assume, for purposes of illustrating the functioning of this invention, that a 2-beat read-write cycle is employed. In this connection, a P-drive would first be applied to the row and column coils coupled to the desired cores, say coils X2 and Y0A, followed by an N-drive to coil X2 and a P-drive to column coil Y0B. This P-drive to column coil Y0B is actually received by the cores affected, namely, cores 1 and 2, as a reverse drive to the P-drive applied to these cores from coil Y0A in view of the reversed winding sense. The drives to the row coils can very handily be made with vacuum tubes or with a magnetic switch of the type described in the previously referred to article entitled Ferrites Speed Digital Computers. The column coils can be driven by vacuum tubes, for which the column coils may serve as plate loads.

As a result of the P- and N-drives above described, core 2 will first be driven to P while core 1 is driven to N. Reading coil A will have induced therein a voltage if core 2 is driven thereby from N to P. In the succeeding interval, when the N-drive is applied to core 2, an inhibiting current may be applied to digit-plane coil A if it is desired to leave core 2 in P, or, if no inhibiting current is applied, then the core is driven to N. Thus, either new information or the same information is applied. Core 1 is meanwhile being driven first to N and then to P. Reading coil B and digit-plane coil B may, during these intervals, also be used for reading and inhibiting.

A preferred way of using the memory as a buffer store is to drive the row and column coils in a sequence to write in and read out information simultaneously. This requires driving each X-coil in sequence with a P-drive and each Y-coil alternately and then in sequence with a P-drive. The cores are then scanned in the sequence of their reference numbers. Thus, the P-drive to coil X2 and Y0A drives core 2 to P; reading coil A reads the condition of core 2. Core 1 is receiving an N-drive simultaneously. From previously determined information, either core 1 is allowed to be driven to N or an inhibiting current is applied to digit-plane coil B to leave the core in P. A P-drive is next applied to coil X3 and Y0B. This drives core 3 to P, and its condition is read this time by reading coil B. Core 2 simultaneously receives an N-drive, and either the previously read condition is rewritten at this time (either by applying or not an inhibit current to the digit-plane coil A) or new information is written into the core. The sequence of excitation of the column coils and row coils is to excite X0 through X7 while alternately exciting Y0A and Y0B. Then X0 through X7 are excited again, while alternately exciting Y1A and Y1B. Of course, the core read-and-write cycle may be randomly applied, but this is not the usual buffer store or magnetic-drum type of operation. It will be appreciated that this identical system may be employed using a plurality of parallel-core planes to enable three-dimensional storage and a readout and write-in of words rather than single digits.

Figure 3:
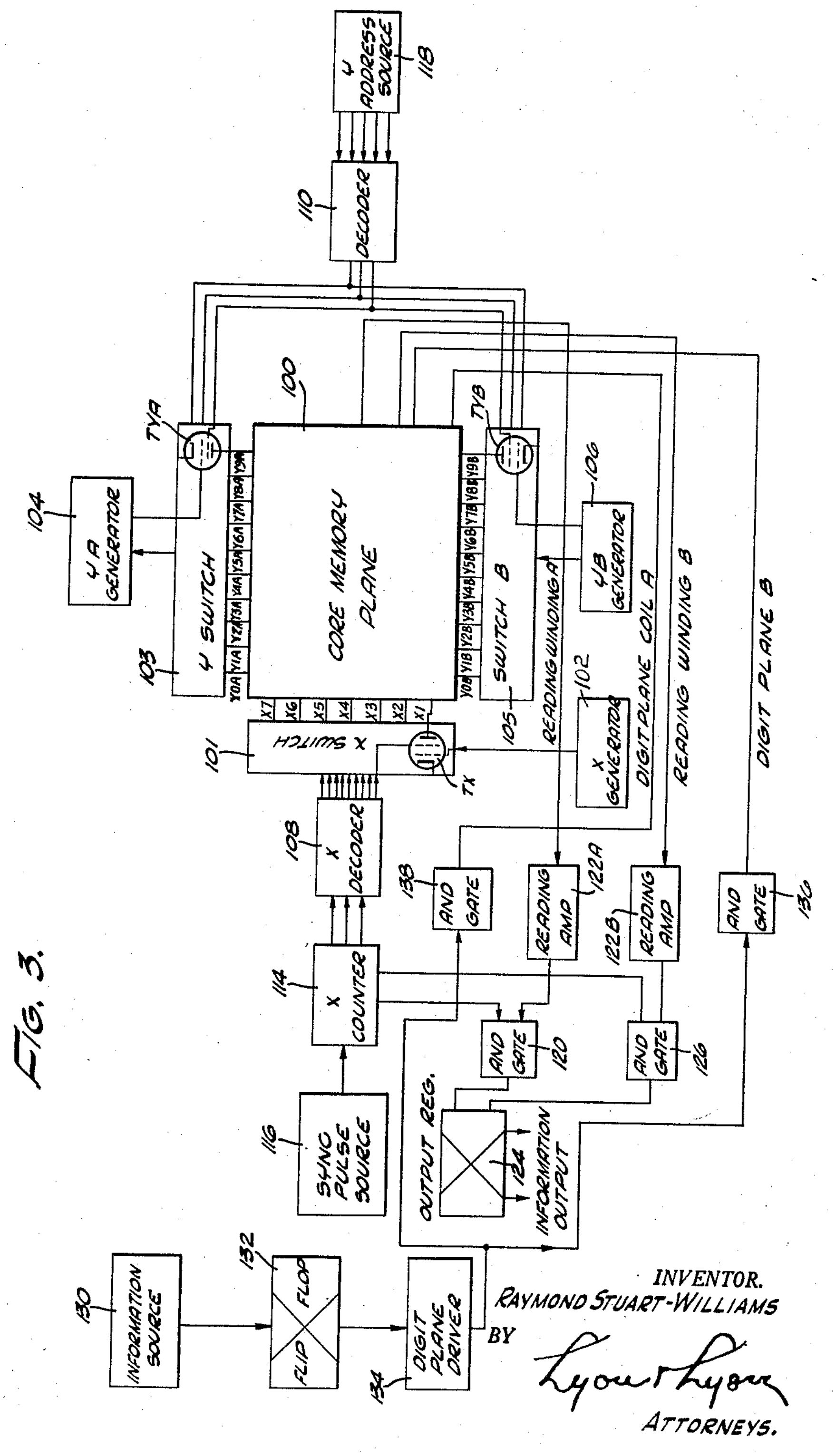
Figure 3 is a block drawing of a system for operating the embodiment of the invention shown schematically in Figure 2.

Referring now to Figure 3, a schematic diagram is shown of one system for operating the embodiment of the invention shown in Figure 2. The core memory plane is represented by a rectangle 100. The row coils X0 through X7 extend to the left of the memory and are driven by an X-switch 101. The column coils, for ease of representation, are shown as extending from the top and bottom of the memory Y0B- to Y9B- coils extending from the bottom and the Y0A- to Y9-coils extending from the top of the memory. These are respectively driven by a Y-switch A 103 and a Y-switch B 105. Both X- and Y-swiches may respectively consist of a plurality of vacuum tubes TX, TYA, and TYB, each one of which has a coil as its plate load. The vacuum tubes may be of the multi-control grid type; one control grid of each tube in the X-switch, for example, is driven by an X-generator 102, and, similarly, in the case of the Y-switch A and Y-switch B, one control grid of each tube is connected to be driven respectively by the YA-generator 104 and YB-generator 106. In the X-switch, as well as in the case of the Y-switches, a second control grid is connected to a decoder. The X-switch is driven by the X-decoder 108 and the Y-switches are driven by the Y-decoder 110. These decoders may be either a tube or diode matrix or combination of flip-flop circuits which, in response to address signals, select the control grid in the switch tubes which is to receive a gating pulse. The tube in the respective one of the switches which receives the gating pulse is enabled to conduct and is driven from the generator connected to the other control grid. The switching and gating techniques and systems described are well-known in the art and can be found shown and described, for example, in chapter 4, Switches and Gates, of the book High Speed Computing Devices, by Engineering Research Associates Staff and published by the McGraw-Hill Book Company.

A counter 114, designated as the X-counter, provides X-address information and controls the X-decoder. The counter is driven by pulses from a sync-pulse source 116. The Y-decoder is addressed by signals from a Y-address signal source 118, which alternately drives the Y-switch A and then the Y-switch B, while the X-switch, which is driven from the X-counter through the X-decoder, sequences the P-drives to the X0-through X7-coils. Reading coil A supplies the detected signal to a reading amplifier 122A and then to an output register through a first And gate 120, which also has an input from the X-counter 114. The information is amplified by the reading amplifier 122 and applied to the output register 124, where it is retained until subsequently utilized. Similarly, when reading coil B is used, its output is applied to a reading amplifier 122B which amplifies it and applies the amplified output to an And gate 126, which is enabled by the X-counter. Through this And gate, digit-plane coil B information is applied to the output register 124.

If it is desired to write information, then this information is obtained from an information source 130. This sets a flip-flop 132, which is established in accordance with the information to be set into the selected core. The flip-flop 132 either actuates or not a digit-plane driver tube 134 in accordance with whether a core is to be left in P or driven to N. The digit-plane driver essentially is a power amplifier which provides an inhibiting current to the digit-plane coil. While a reading operation occurs in reading coil A, the digit-plane driver can apply an inhibiting current through an And gate 136, which is primed by a pulse from the X-counter. This current flows through digit-plane coil B and inhibits the odd core in the group which is receiving an N-drive. When digit-plane coil A is to receive an inhibiting current, then the X-counter prepares And gate 138 instead of And gate 136. Of course, the information source can also be the output register 124, which has the data secured from a previous reading of the odd core.

The X-counter, in addition to cycling the X-decoder and switch, also provides signals to prime the proper And gates for the purpose of enabling either the reading coil A to have access to the reading amplifier while digit-plane coil B receives an inhibit drive or to reverse this situation. With odd cores and even cores constituting the separate groups, the odd and even counts of the X-counter are used to prime the proper And gates. And gates, flip-flops, and registers of suitable types are also well known in the art and may be found described, for example, in the previously mentioned book entitled, High Speed Computing Devices.

Figure 4:
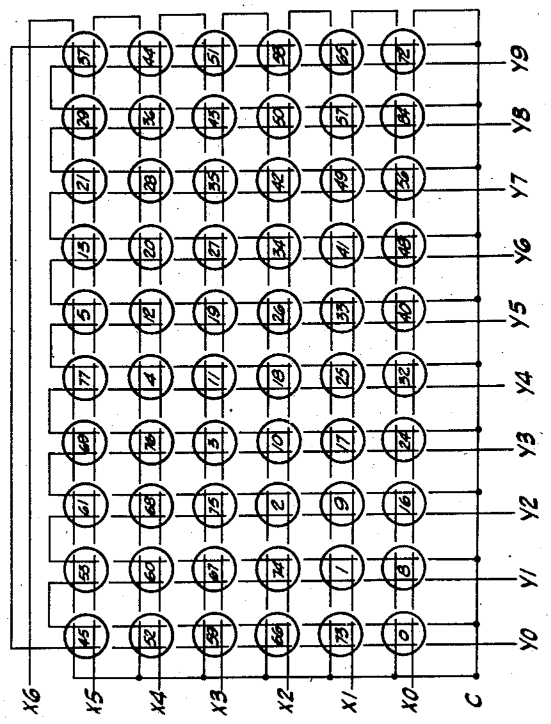
Figure 4 is a schematic drawing of another embodiment of the invention.

Reference is now made to Figure 4 of the drawings, which shows schematically a simpler arrangement of an embodiment of the invention for cyclic operation. The cyclic operation drives the cores in the numbered sequence shown in the drawing. Digit-plane coils A and B and reading coils A and B are not shown, in order to simplify the drawings. However, they are coupled in the same manner as shown in Figure 2; namely, digit-plane coil and reading coil A are coupled to the odd cores, which constitute one group, and digit-plane coil B and reading coil B are coupled to the even cores, which constitute a second group. The row or X-coils are coupled in the same manner as shown in Figure 3. The column coils Y0 through Y9 are respectively coupled to the cores in the same manner as are the row coils, i. e., each row coil may be considered as having two parts which are in series. When a current is applied to the row coil, one row of cores, which is coupled to one part, receives a drive in the P-direction, while the adjacent row of cores, coupled to the other part, receives a drive in the N-direction. The column coils, likewise, may be considered as being in two parts, which are in series. A drive applied to a column coil serves to drive the cores in a column coupled to one part in the direction P, while the cores in a column coupled to the other part receive a drive in the direction N.

The progression of the reading and writing in the cores is as indicated by the numbering sequence: row coils X0 through X6 may be driven in sequence, column coils Y0 through Y9 are driven in a sequence Y0 through Y6, then Y1 through Y7, Y2 through Y8, etc. Thus, two groups of cores are shown, wherein one core in each group simultaneously receives a drive to saturation in the opposite polarity. One core receiving the reading drive is coupled to a detecting coil, and the other core receiving the writing drive is coupled to an inhibiting coil.

Figure 5:
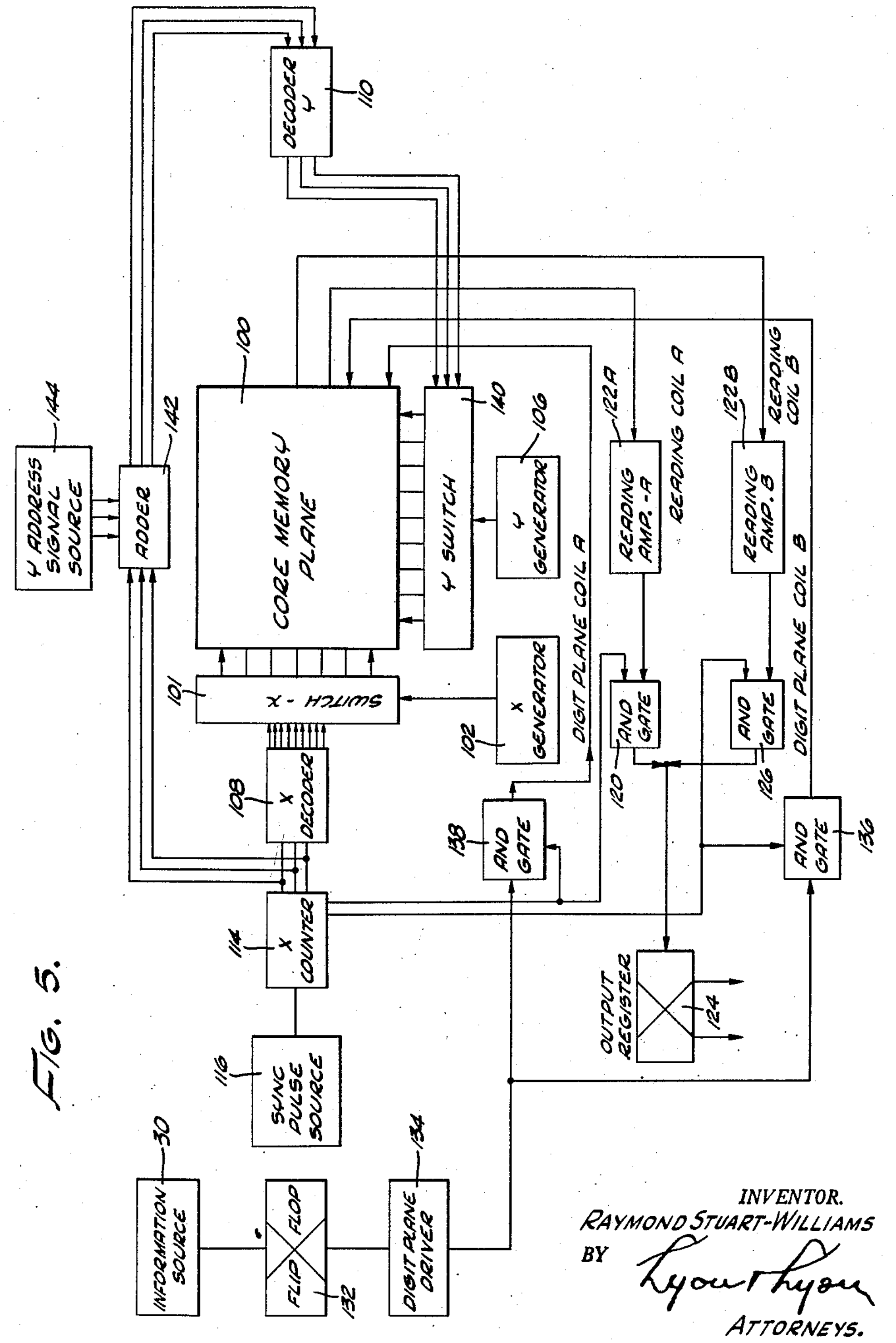
Figure 5 is a schematic diagram of a system which may be employed for operating the embodiment of the invention shown in Figure 4.

Figure 5 is a schematic diagram of a system which may be employed to drive the memory shown in Figure 4. The logic of the And-gate circuits coupled to the digit-plane coils is essentially the same as shown in Figure 3, and similarly functioning apparatus in Figure 5 is given the same reference numerals as Figure 3. With the elimination of one of the two column coils, which were shown in Figure 2, only a single Y-switch 140 is required which is power driven from a Y-generator 106 and sequenced from a Y-decoder 110. The X-switch 101 is power driven from an X-generator 102 and sequenced by an X-decoder 108, which receives sequencing information from an X-counter 114. The X-counter also provides count signals to an adder 142. This adder 142 may consist of a register, to which signals from a Y-address signal source 144 are applied in addition to the signals received from the counter. These signals are combined by the adder to provide address signals which are decoded and then applied to cycle the Y-switch in the manner recited previously in order that the memory may be scanned successively in accordance with the scanning pattern shown in Figure 4.

Figure 6:
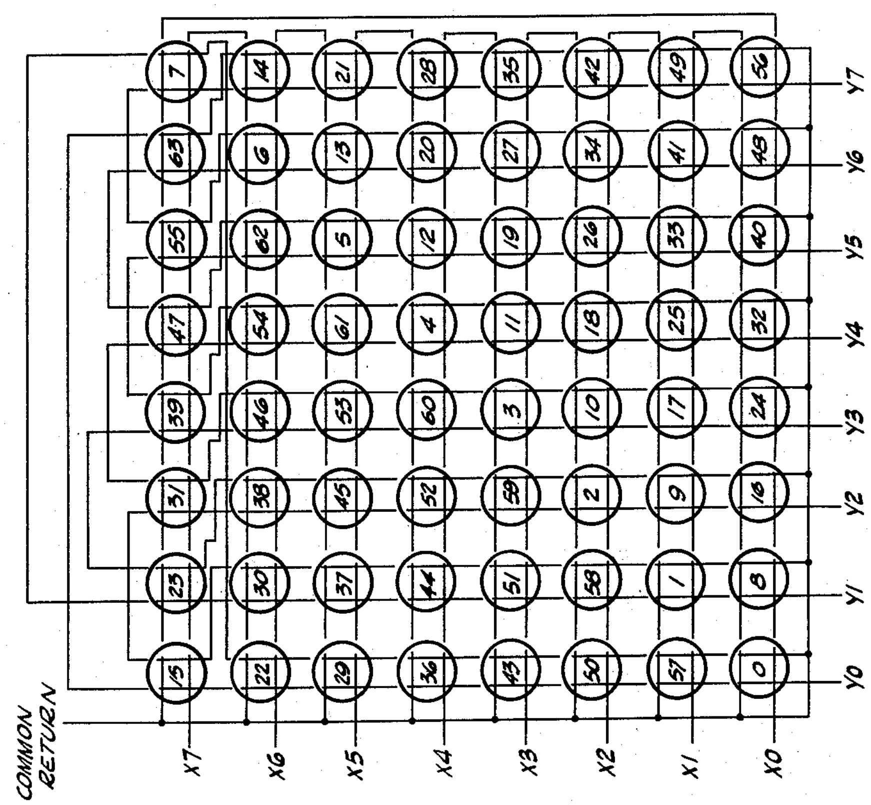
Figure 6 is a schematic diagram of another embodiment of the invention.

Figure 6 represents another embodiment of the invention. The row and column coils in this embodiment are coupled to the cores of the respective rows and columns in substantially the same manner as described previously, the difference herein lying in the method of coupling one part of the two parts of each column coil to the cores. For example, consider column coil Y7. It is coupled to the column of cores respectively numbered 7, 14 . . . 56. The second part of coil Y7 is coupled to core 55, then goes back to the column including cores 6, 13 . . . 48. The core 63, which is in the same row as core 55, is not coupled to the second part of column coil Y7. Column coil Y6, similarly, skips one core in the adjacent column to which the remainder of its second part is coupled, and, instead, is coupled to the core in the next to the adjacent column. Row coil X0 has one part coupled to the bottom row of cores and its second part coupled to the top row of cores. The operation of the memory is the same; the cycling of the row and column coils provides a scanning operation in the numbered sequence shown, and this, in each instance, enables reading the condition of the higher-numbered core and writing data into the preceding core, these cores being respectively in different groups.

First and second digit-plane coils and first and second reading coils are not shown in order to preserve the clarity of the drawing. However, they are coupled respectively to the two core groups in the manner shown in Figure 2 to enable simultaneous reading and writing for one core from each group.

Figure 7:
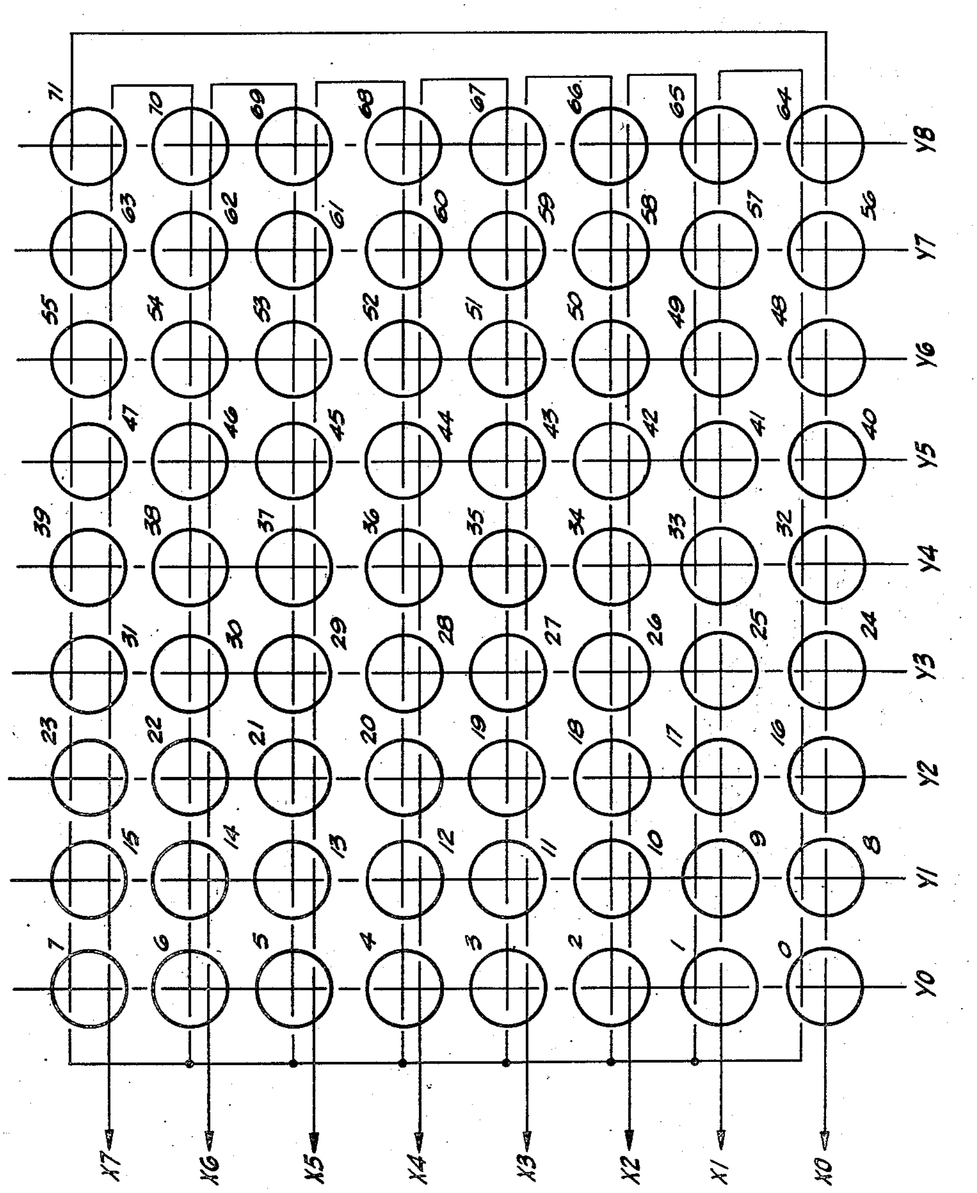
Figure 7 is a schematic drawing of a preferred embodiment of the invention.

A preferred embodiment of the invention is shown in Figure 7. Digit-plane coils A and B and reading coils A and B are omitted from the drawing for simplification. It is to be understood, however, that they are employed in the manner shown in Figure 2, that is, the two groups of cores may be constituted as the odd and even numbered cores and the A and B digit-plane and reading coils are accordingly coupled thereto. In this arrangement the X-coils are arranged in similar fashion as they are in Figure 1, that is, the first section of the X-coil is coupled to a row with one polarity and the second section of the X-coil is coupled to another row with the opposite polarity. Only one Y-coil per column of cores is used. The coupling sense of each of the Y-coils reverses on each succeeding core so that, for example, a P-current pulse applied to a Y-coil provides a P-magnetomotive force to the even numbered cores and an N-magnetomotive force to the odd numbered cores. The converse is true if an N-current pulse is applied to a Y-coil.

In operation, P-current pulses are always applied to the X-coils but first a P- then an N-current pulse is applied to a Y-coil. For example, a P-current pulse is first applied to coil X2. After a time, at least sufficient for disturbances due to the application of this P-current pulse to subside, a P-current pulse is applied to the Y2 coil. This results in applying a drive to saturation at P-polarity on core 18 and a drive to saturation at N-polarity on core 17. Reading coil A will detect a voltage or not dependent on the previous saturation of core 18. Digit-plane coil B will or will not receive an inhibiting current dependent on the information desired to be stored therein. A P-current pulse is next applied to coil X3. After an interval, as indicated above, an N-current pulse is applied to coil Y2. This causes core 19 to be driven to saturation at P and core 18 to be driven toward saturation at N. An inhibit pulse is applied to the digit-plane coil A if required to maintain core 18 in P. The inhibit current pulse preferably should be applied after the application of the current pulse to an X-coil and before the application of a current pulse to a Y-coil. The Y-coils may be readily driven by magnetic core switches of the type previously referred to. The X-coils are preferably driven by vacuum tube drives. It will be noted that Figures 2 and 7 are substantially similar except that only one Y-coil is used per column instead of two as in Figure 2.

Figure 8:
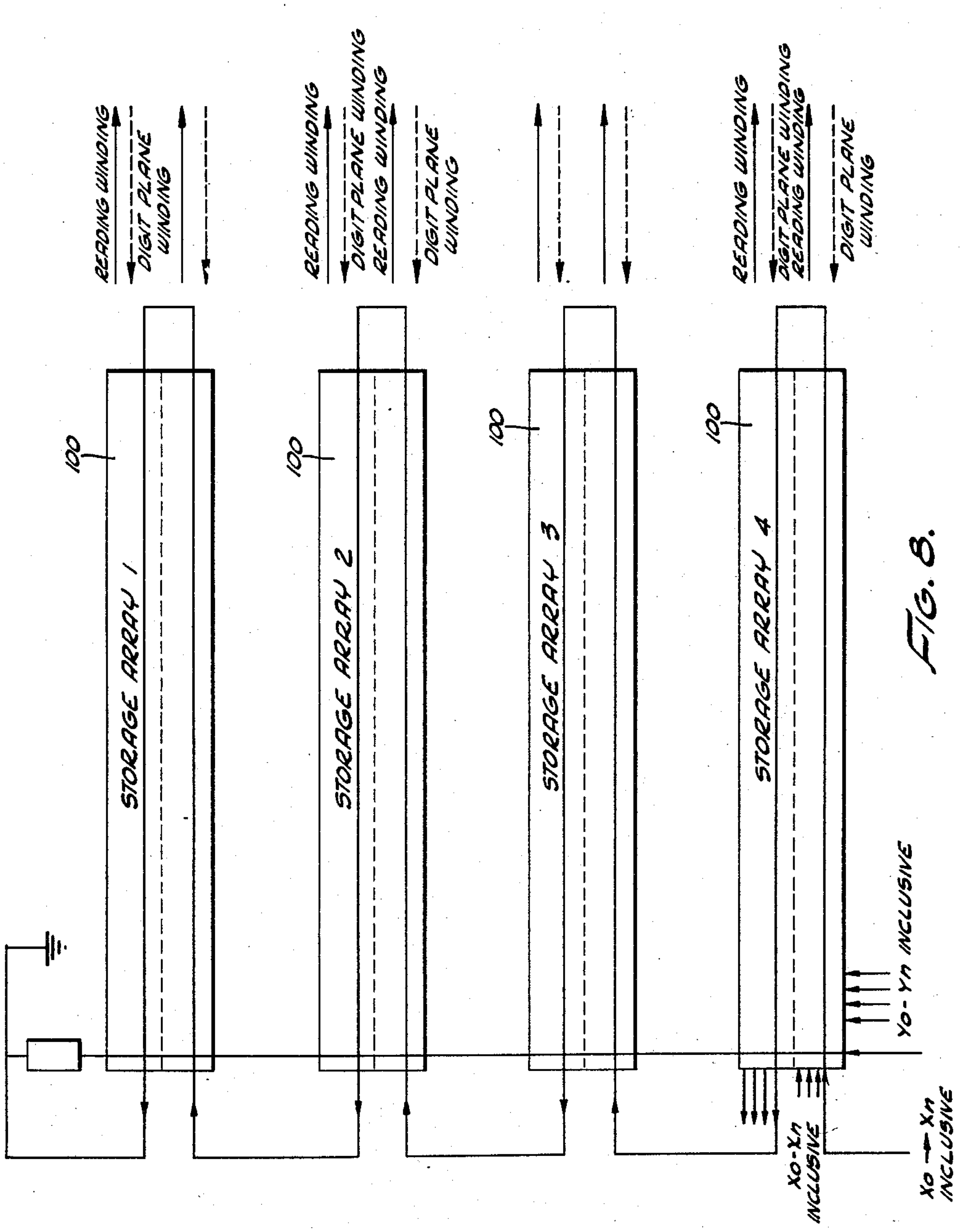
Figure 8 is a block diagram of a three dimensional memory employing the embodiment of the invention shown in Figure 7.

A suitable arrangement for a three dimensional type of core memory where a a word, consisting of a number of digits, may be read out at one time while another word may be stored, is shown in the block diagram of Figure 8. Each rectangle 100 represents a core memory plane with two digit-planes and two reading coils arranged as previously described. The X and Y coils within each memory are coupled to the cores in the manner described, for example, in Figure 7. However, the corresponding Y-coils for all the memories are connected in series and the corresponding X-coils for the memories are also connected in series in a manner so that, when an X-coil and a Y-coil are driven, the corresponding two cores in each of the memories receive drives to P and N respectively. Thus, a word may be read out of the memory employing one of the reading windings in each core plane while writing a word into the memory employing one of the digit-plane coils in each core plane.

It will be appreciated that the system shown herein is a time-saving one, all times of operation being employed for both reading and writing. The windings are simple to apply, and, when the memories are not excessive in size, no special precautions need be taken to avoid unwanted signal effects. As a matter of fact, with memories which are not excessive in size, larger cores may be used, such as switch cores. These permit more than one turn to be taken on the core. This raises the impedance presented to the driving tubes, and thus makes for a better impedance match. Furthermore, the signal induced in the reading coil from such a core being driven is much larger than that from the cores, which permit only single-turn coupling.

With respect to utilization of these systems for three-dimensional storage, it will be appreciated that either of at least two systems may be employed. In one, each memory-core plane in the three-dimensional array may include two digit-plane coils, and each memory plane in the entire array is simultaneously read from and written into, as represented by Figure 8. In the other scheme, one-half the available word length may be used. Here, only a single digit-plane coil is coupled to all the cores in each digit plane. All the cores in a digit plane are included within a single group, and, to enable one core in one group to be driven to P while the other core in another group is driven to N, opposite drives are applied to the respective digit-core planes. The inhibiting current, where required, is applied to an entire core plane receiving an N-drive while other core planes are receiving the P or reading drives. Of course, utilizing a three-dimensional memory in this fashion cuts the available word length in half. It is also possible to reduce the number of cores in a group and increase the number of digit-plane coils and reading coils coupled to a digit plane, whereby two or more cores may be read while writing proceeds with two or more other cores in each plane.

Employing the X-and Y-coil arrangements described herein, it is also possible, especially with the smaller sized core arrays, to use one digit-plane coil as a reading coil while the other digit-plane coil is being used for inhibiting purposes. The roles of the respective digit-plane coils is then reversed on the next X and Y drive cycle. This is feasible because of the drive of one core in one group to P while a core in the other group is driven to N. Thus, the reading coil and the expense of the winding thereof may be saved.

Accordingly, there has been described and shown hereinabove novel, useful, and simple system and apparatus for reading while writing in a magnetic-core memory.

I claim:

1. A magnetic-memory system comprising a plurality of magnetic cores each core having substantially rectangular hysteresis characteristics, said plurality of cores being divided into at least two groups, means to drive to saturation at one polarity a core in one group while simultaneously driving a core in the second group to saturation at the opposite polarity, a first digit-plane coil coupled to all the cores in said one group, a second digit-plane coil coupled to all the cores in said second group, a first reading coil coupled to all the cores in one group and a second reading coil coupled to all the cores in said second group.

2. A memory system comprising a plurality of magnetic cores arranged in columns and rows, each core having substantially rectangular hysteresis characteristics, means to selectively apply to one of said rows of cores magnetomotive forces less than the amount required to drive said cores to saturation at one polarity while simultaneously applying substantially equal and opposite magnetomotive forces to a second row of cores, means to selectively apply to one of the cores in said one of said rows sufficient additional magnetomotive forces to drive said one core to saturation at said one polarity while simultaneously applying substantially equal and opposite magnetomotive forces to one of the cores in said second row of cores, a reading coil coupled to said one of the cores in said one of said rows, and a digit-plane coil coupled to the said one of the cores in said second row of cores.

3. A memory system as recited in claim 2 wherein said means to selectively apply to one of said rows of cores magnetomotive forces at one polarity while simultaneously applying substantially equal and opposite magnetomotive forces to a second row of cores includes a coil inductively coupled to all the cores in said one of said rows in one sense and inductively coupled to all the cores in said other of said rows in the opposite sense.

4. A memory system as recited in claim 2 wherein said means to selectively apply to one of the cores in said one of said rows sufficient additional magnetomotive forces to drive said one core to saturation at one polarity while applying substantially equal and opposite magnetomotive forces to one of the cores in said second row of cores includes a coil inductively coupled in one sense to said one of the cores in said one row and inductively coupled in an opposite sense to said one of the cores in said second row.

5. A memory system as recited in claim 2 wherein said means to selectively apply to one of the cores in said one of said rows sufficient additional magnetomotive forces to drive said one core to saturation at one polarity while applying substantially equal and opposite magnetomotive forces to one of the cores in said second row of cores includes a coil inductively coupled in one sense to all the cores in a column which includes said one of the cores in said one row and inductively coupled in an opposite sense to all the cores in another column which includes said one of the cores in said second row.

6. A magnetic-memory system comprising a plurality of magnetic cores arranged in columns and rows, each core having substantially rectangular hysteresis characteristics, a plurality of row coils, each of said row coils being coupled to a different two rows of cores, the coupling to the cores of one of the two rows being in one sense, the coupling to the cores of the other of the two rows being in the opposite sense, a plurality of column coils, each column coil being coupled to all the cores in a different column, each column coil being coupled to a core in each of said ones of said two rows with one winding sense and being coupled to a core in each of said others of said two rows with the opposite winding sense, a first digit-plane coil, a first reading coil, said first digit-plane and reading coils both being inductively coupled to all the cores in all said ones of said two rows, a second digit-plane coil, a second row coil, said second digit-plane and reading coils both being inductively coupled to all the cores in all said others of said two rows.

7. A magnetic-memory system comprising a plurality of magnetic cores arranged in columns and rows, each core having substantially rectangular hysteresis characteristics, a plurality of row coils, each of said row coils being coupled to a different two rows of cores, the coupling to the cores of one of the two rows being in one sense, the coupling to the cores of the other of the two rows being in the opposite sene, a plurality of pairs of column coils each pair being coupled to all the cores in a different column, each pair being coupled to the same core in a column with the opposite winding sense, the winding sense being reversed on each successive core, a first digit-plane coil, a first reading coil, said first digit-plane and reading coils being coupled to all the cores in alternate rows and a second digit-plane coil, a second reading coil, said second digit-plane and reading coils being coupled to all the cores in the remaining ones of said rows.

8. A magnetic-memory system comprising a plurality of magnetic cores arranged in columns and rows, each core having substantially rectangular hysteresis characteristics, a plurality of row coils, each of said row coils being coupled to a different two rows of cores, the coupling to the cores of one of the two rows being in one sense, the coupling to the cores of the other of the two rows being in the opposite sense, a plurality of column coils each of which is coupled to a different two columns of cores, the coupling to the cores of one of the two columns having one sense, the coupling to the cores of the other of the two columns having the opposite sense, a first digit-plane winding coupled to all the cores in alternate rows, and a second digit-plane winding coupled to all the cores in the remaining ones of said rows.

9. A magnetic-memory system comprising a plurality of magnetic cores arranged in columns and rows, each core having substantially rectangular hysteresis characteristics, a plurality of row coils, each of said row coils being coupled to a different two rows of cores, the coupling to the cores of one of the two rows being in one sense, the coupling to the cores of the other of the two rows being in the opposite sense, a plurality of column coils each of which comprises two parts connected in series, said first part being coupled in one sense to all the cores in one column, said second part being coupled in the opposite sense to one core of another column and in said opposite sense to all the cores in a third column except the core in the same row as said one core, a first digit-plane winding coupled to all the cores in alternate rows, and a second digit-plane winding coupled to all the cores in remaining ones of said rows.

10. A magnetic-memory system comprising a plurality of magnetic cores, each core having substantially rectangular hysteresis characteristics, said plurality of cores being arranged as a plurality of core planes, each plane including cores arrayed in columns and rows, each core plane including two groups of cores each consisting of substantially half the cores in a core plane, a different reading coil coupled to all the cores in each group of cores in a core plane, and a different digit-plane coil coupled to all the cores in each group of cores in a core plane.

11. A magnetic-memory system as recited in claim 10 wherein each core plane includes a plurality of row coils, each of said row coils being coupled to a different two rows of cores, the coupling to the cores in one of said two rows being in one sense, the coupling to the cores in the other of said two rows being in the opposite sense, and a plurality of column coils each column coil being coupled to all the cores in a different column, each column coil being coupled to a core of one group in a column with one winding sense and to a core of another group in a column with the opposite winding sense.

12. A magnetic-memory system as recited in claim 10 wherein each core plane includes a plurality of row coils, each of said row coils being coupled to a different two rows of cores, the coupling to the cores in one of said two rows being in one sense, the coupling to the cores in the other of said two rows being in the opposite sense, and a plurality of column coils each of which is coupled to a different two columns of cores, the coupling to the cores of one of the two columns having one sense, the coupling to the cores of the other of the two columns having the opposite sense.

13. A magnetic-memory system as recited in claim 10 wherein each core plane includes a plurality of row coils, each of said row coils being coupled to a different two rows of cores, the coupling to the cores in one of said two rows being in one sense, the coupling to the cores in the other of said two rows being in the opposite sense, a plurality of column coils each of which comprises two parts connected in series, said first part being coupled in one sense to all the cores in one column, said second part being coupled in an opposite sense to one core of another column and in said opposite sense to all the cores in a third column except the core in the same row as said one core.

References Cited in the file of this patent

UNITED STATES PATENTS 2,719,965 Person ------------------ Oct. 4, 1955
2,740,949 Counihan et al. ---------- Apr. 3, 1956